United States Patent [19]

Satake

[11] 4,181,912
[45] Jan. 1, 1980

[54] ELECTROSTATIC RECORDING APPARATUS COMPRISING IMPROVED ELECTRODE SWITCHING MEANS

[75] Inventor: Yoshiaki Satake, Tokyo, Japan

[73] Assignee: Ricoh Co., Ltd., Tokyo, Japan

[21] Appl. No.: 900,166

[22] Filed: Apr. 26, 1978

[30] Foreign Application Priority Data

May 12, 1977 [JP] Japan .................................. 52-54722
May 13, 1977 [JP] Japan .................................. 52-55003
May 14, 1977 [JP] Japan .................................. 52-55678

[51] Int. Cl.² .................... G01D 15/06; G03G 15/048
[52] U.S. Cl. ..................................... 346/154; 346/150
[58] Field of Search ............... 346/154, 153, 155, 162, 346/163; 358/300

[56] References Cited

U.S. PATENT DOCUMENTS

| | | | |
|---|---|---|---|
| 3,196,451 | 7/1965 | Jones | 346/154 |
| 3,564,556 | 2/1971 | Tsukatani | 346/154 |
| 3,653,065 | 3/1972 | Brown, Jr. | 346/154 |
| 3,792,495 | 2/1974 | Bliss | 346/154 |
| 3,979,760 | 9/1976 | Tadauchi | 346/154 |
| 4,054,885 | 10/1977 | Rothgordt | 346/154 |

*Primary Examiner*—Jay P. Lucas
*Attorney, Agent, or Firm*—David G. Alexander

[57] ABSTRACT

Groups of recording electrodes are alternatingly connected to two sets of data bus lines. A high voltage for electrostatic recording on a sheet of paper is applied from a power source to inputs of data switches which are connected to the respective bus lines. Power switches are provided between the power source and the sets of bus lines respectively to alternatingly gate the high voltage to the sets of bus lines. Opposite high voltages are sequentially applied to rear electrodes provided behind the recording electrode groups in synchronization with application of the high voltage to the data switches so that only the recording electrode group conjugate to the energized rear electrode applies an electrostatic recording charge to the paper. Data signals are applied to the data switches to cause the same to pass or block the high voltage to the individual bus lines in accordance with whether the data signals are logically high or low. Means are provided to minimize power consumption, storage time of the power switches and to apply the high voltage to the data switches for an optimum time at various recording speeds. The two sets of data switches may be embodied by only one set of data switches and suitable gate means.

9 Claims, 11 Drawing Figures

Fig. 11

ELECTROSTATIC RECORDING APPARATUS COMPRISING IMPROVED ELECTRODE SWITCHING MEANS

BACKGROUND OF THE INVENTION

The present invention relates to an electrostatic recording apparatus which may be advantageously incorporated in the receiver of a facsimile system.

A recording apparatus of this type generally comprises a plurality of recording electrodes in the form of thin needles provided in a row. A sheet of recording paper is moved closely adjacent to the electrodes in a direction perpendicular to the row. The electrodes are individually energized with a high voltage or grounded in dependence on applied data signals from a facsimile transmitter or the like to apply an electrostatic charge to the paper in areas adjacent to the energized electrodes. As the paper is moved incrementally or continuously past the electrodes, new sets of data signals corresponding to scan lines of an original document scanned by the facsimile transmitter are applied to the electrodes to progressively form a complete electrostatic image. A dry or liquid toner substance is applied to the sheet to form a visible toner image which is fixed to the sheet to provide a permanent reproduction of the original document.

A problem has existed in such an apparatus which has motivated various improvements to the basic design. In the basic apparatus, a single rear electrode is preferably provided adjacent to the recording electrodes so that the paper passes therebetween. In the basic design, the electrodes of the entire scan line are utilized simultaneously, which can result in a very large amount of power dissipation. To overcome this drawback, it has been known to provide a set of data bus lines and connect the recording electrodes to the bus lines in groups. A rear electrode is provided behind each group of recording electrodes. The data signals are applied to the bus lines and thereby to all of the groups of recording electrodes. However, an electrostatic recording charge will be applied to the paper only by the group of recording electrodes corresponding to an energized rear electrode. The rear electrodes are energized in sequence along the scan line so that electrostatic recording is accomplished group by group, greatly reducing the power dissipation.

This arrangement also greatly reduces the number of electronic circuits in the apparatus. Where 1728 needle electrodes are provided in the row and there are 96 bus lines, there are 18 groups of 96 electrodes each and the number of data switch circuits is reduced by a factor of 18.

However, a recording apparatus thus far developed in the prior art still dissipates an excessive amount of power, producing undesirable heat, and comprises an excessive amount of electronic circuitry. The storage time of transistors in switch circuits tends to vary in accordance with the data signals and the characteristics of the transistors and limit the recording speed and quality. In addition, the image density tends to vary at different recording speeds, being excessive at low speeds and producing ghost images.

SUMMARY OF THE INVENTION

It is an object of the present invention to provide an electrostatic recording apparatus for facsimile transmission or the like which features greatly reduced power dissipation compared to the prior art.

It is another object of the present invention to provide an electrostatic recording apparatus which features a greatly reduced number of electronic components compared to the prior art.

It is another object of the present invention to provide an electrostatic recording apparatus comprising means for reducing the storage time of switching transistors and thereby operate at increased speed and produce higher quality recording over the prior art.

It is another object of the present invention to provide an electrostatic recording apparatus which produces high quality images at all recording speeds.

It is another object of the present invention to provide a generally improved electrostatic recording apparatus.

In accordance with the present invention, groups of recording electrodes are alternatingly connected to two sets of data bus lines. A high voltage for electrostatic recording on a sheet of paper is applied from a power source to inputs of data switches which are connected to the respective bus lines. Power switches are provided between the power source and the sets of bus lines respectively to alternatingly gate the high voltage to the sets of bus lines. Opposite high voltages are sequentially applied to rear electrodes provided behind the recording electrode groups in synchronization with application of the high voltage to the data switches so that only the recording electrode group conjugate to the energized rear electrode applies an electrostatic recording charge to the paper. Data signals are applied to the data switches to cause the same to pass or block the high voltage to the individual bus lines in accordance with whether the data signals are logically high or low. Means are provided to minimize power consumption, storage time of the power switches and to apply the high voltage to the data switches for an optimum time at various recording speeds.

Other objects, together with the foregoing, are attained in the embodiments described in the following description and illustrated in the accompanying drawing.

DESCRIPTION OF THE PREFERRED EMBODIMENTS

While the electrostatic recording apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
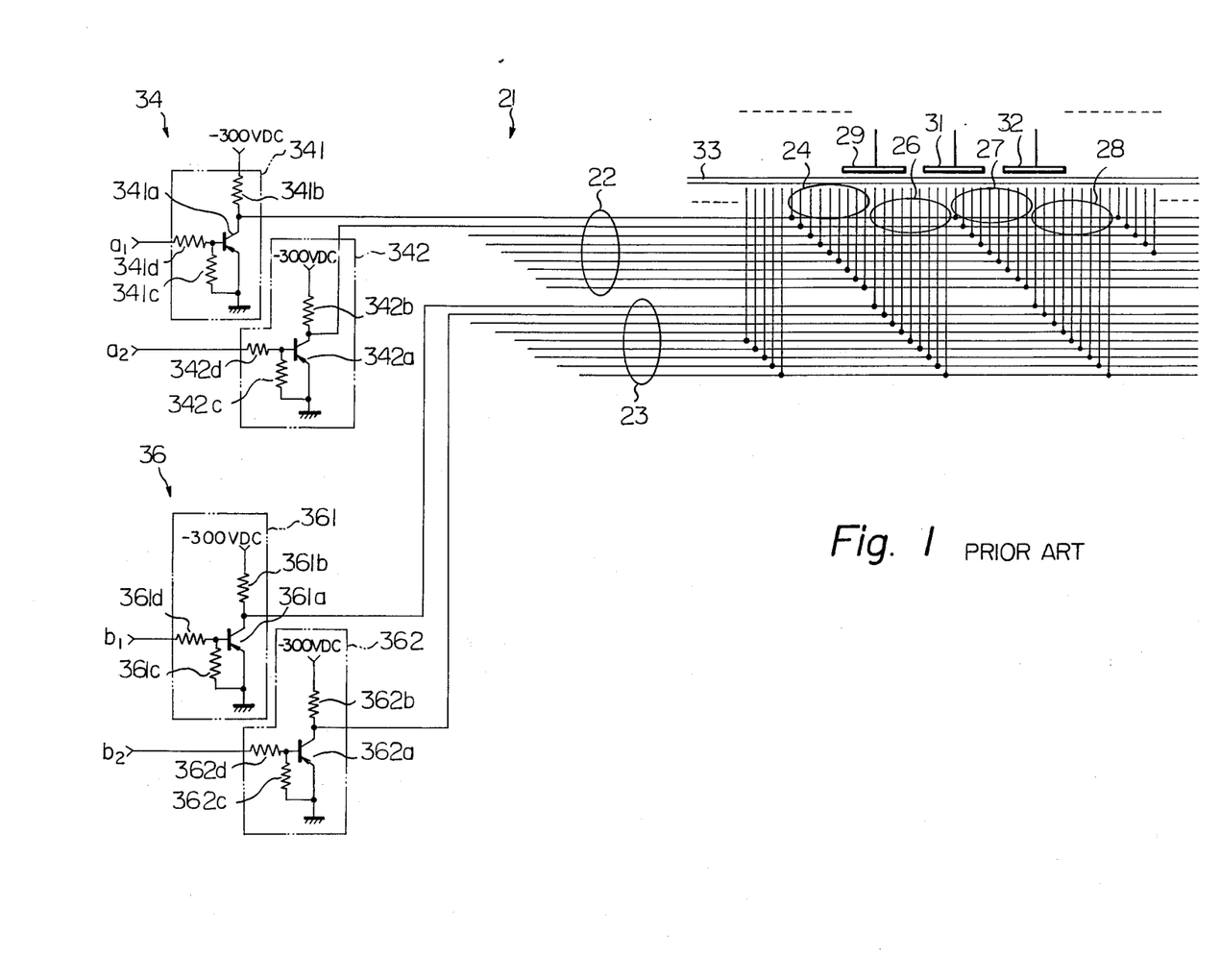
FIG. 1 is an electrical schematic diagram of an improved prior art electrostatic recording apparatus.

Referring now to FIG. 1 of the drawing, prior art electrostatic recording apparatus of improved type is generally designated by the reference numeral 21 and comprises a plurality of first data bus lines 22 and a plurality of second data bus lines 23. There are, for example, 48 each of the bus lines 22 and 23, although only 9 each are shown for simplicity of illustration.

Groups of recording electrodes in the form of needles are alternatingly connected to the bus lines 22 and 23, four of the groups being shown and designated as 24, 26, 27 and 28. Each electrode group comprises 48 electrodes which are connected to the respective bus line. It will be noted that the groups 24 and 27 are connected to the bus lines 22 whereas the groups 26 and 28 are connected to the bus lines 23. Typically, there are 36 groups of recording electrodes, or a total of 1728 electrodes are arranged in a row. There are 18 groups connected to each of the bus lines 22 and 23.

Further illustrated are rear electrodes 29, 31 and 32 which are provided adjacent to the groups 24, 26, 27 and 28, the rear electrodes in pairs being individually energized in sequence.

For recording, a sheet of recording paper 33 is moved between the electrode groups 24, 26, 27 and 28 and the rear electrodes 29, 31 and 32 in a direction normal to the plane of the drawing, or perpendicular to the row of electrodes. In a manner to be described in detail below, data signals representing a transmitted facsimile image or the like are alternatingly applied to data switch groups 34 and 36 which gate −300 VDC to those respective bus lines 22 and 23 corresponding to black image areas.

More specifically, data signals representing the leftmost image information are applied to the data switch group 34 which causes −300 VDC to be applied to those bus lines 22 representing dark image information. Simultaneously, +300 VDC is applied to the leftmost rear electrode and the next (second) rear electrode (not shown). This causes an electrostatic charge to be formed on the paper 33 in areas adjacent to recording electrodes in the leftmost group (not shown) to which the −300 VDC was applied, or to the dark image areas. Then, the leftmost recording electrode and the next electrode are deenergized and the second and third rear electrodes (not illustrated) are energized with +300 VDC. Simultaneously, data signals are applied to the data switch group 36 which causes −300 VDC to be applied to those bus lines 23 representing dark image information in the next rightward image area. As a result, electrostatic recording is performed by the electrode group next to the leftmost group (not shown). In this manner, electrostatic recording is accomplished from left to right, one electrode group at a time. Although −300 VDC applied to the bus lines 22 or 23 appears at the respective recording electrodes of each group, electrostatic recording occurs only at the recording electrode group adjacent to the energized electrode pair. In other words, recording will not occur if −300 VDC is applied to a recording electrode unless +300 VDC is applied to the adjacent electrode pair.

The data switch group 34 comprises data switches connected between the −300 VDC source and the respective bus lines 22. Although the data switch group 34 actually comprises 48 data switches which are connected to the respective bus lines 22, only two data switches are shown and designated as 341 and 342. The data switches 341 and 342 and those of the group 36 are identical and like elements are designated by the characters "a", "b" ... suffixed to the numerals 341, 342, 361 and 362. Only the components of the data switch 341 will be described in detail to avoid unnecessary repetition.

The data switch 341 comprises a PNP transistor 341a, the emitter of which is grounded. The collector of the transistor 341a is connected to the −300 VDC power supply through an output resistor 341b. The collector of the transistor 341a is further connected to a respective one of the bus lines 22. A selfbias resistor 341c is connected between the base of the transistor 341a and ground. A data signal $a_1$ is applied to the base of the transistor 341a through an input resistor 341d.

When the data signal $a_1$ is logically high (positive), the transistor 341a is turned off and −300 VDC is applied to the respective bus line 22 through the resistor 341b. Electrostatic recording occurs at the recording electrode connected to the respective bus line 22 in the group with the energized electrode pair.

Alternatively, if the signal $a_1$ is logically low (negative), the transistor 341a is turned on and the respective bus line 22 is grounded through the collector circuit of the transistor 341a. This prevents electrostatic recording at all electrodes connected to the respective bus line 22.

The data signals applied to the switch group 34 for gating the bus lines 22 are designated as $a_1, a_2 \ldots$. The data signals for the switch group 36 and bus lines 23 are designated as $b_1, b_2 \ldots$. The signal $a_1, a_2 \ldots$ are applied in alternation with the signals $b_1, b_2 \ldots$ in the manner described above. To prevent erroneous recording, it is necessary to ground all bus lines 22 and 23 to which the −300 VDC signals are not applied for recording.

Although the apparatus 21 represents an improved form of the prior art, it still suffers from the drawback of excessive power consumption. Since the bus lines 22 and 23 are utilized alternatingly, all unused bus lines must be grounded. For example, if the bus lines 22 are being used for recording, all of the bus lines 23 must be grounded.

Taking for example the switch 341, it will be understood that a logically low signal $a_1$ applied to the base of the transistor 341a turns the same on, grounding the respective bus line 22 through the collector circuit of the transistor 341. This action places the collector of the transistor 341a ground potential and causes current flow through the resistor 341b and the collector circuit of the transistor 341a to ground. Thus, there is maximum current flow through all of the data switches of the group 34 or 36 to which data signals are not being applied for recording. This current constitutes a complete waste of electrical power.

Figure 2:
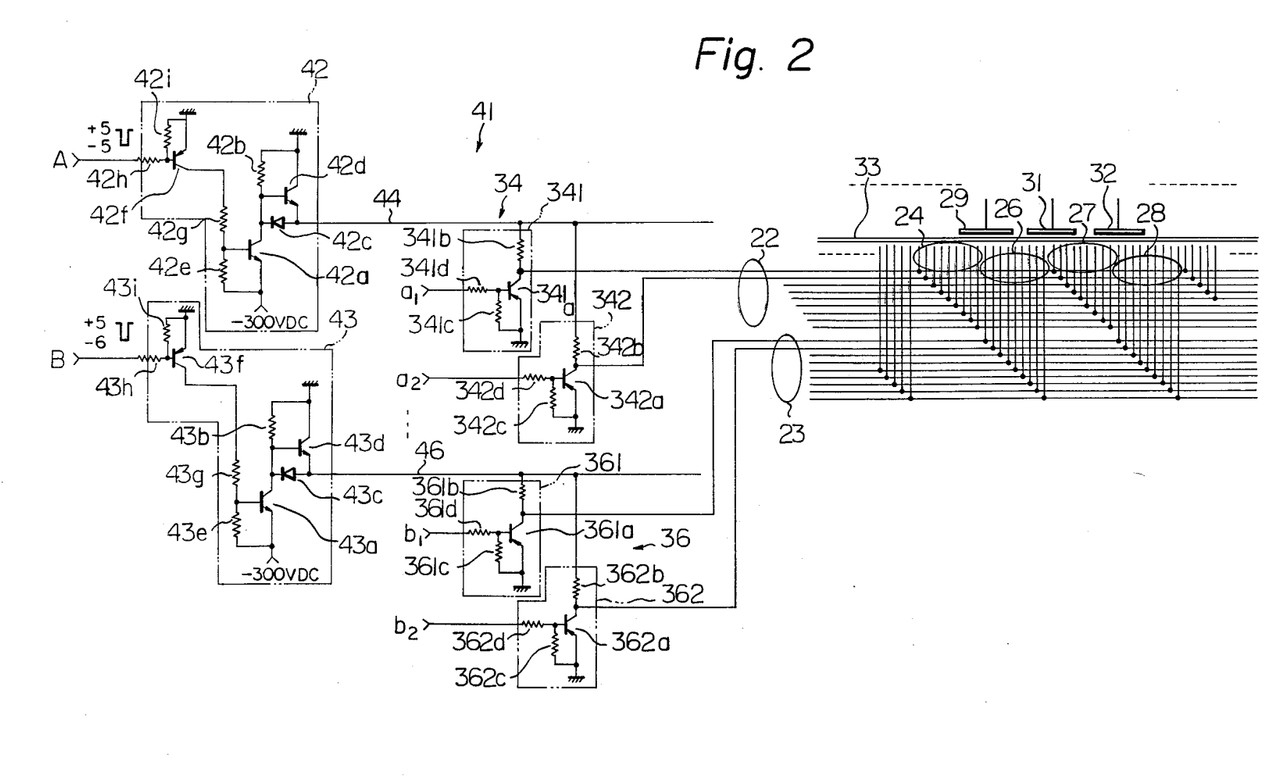
FIG. 2 similarly shows an electrostatic recording apparatus embodying the present invention.

This drawback is overcome in an electrostatic recording apparatus 41 which embodies the present invention and is shown in FIG. 2. Like elements are designated by the same reference numerals used in FIG. 1.

The apparatus 41 comprises power switches 42 and 43 which are identical, like elements being designated by the characters "a", "b" . . . suffixed to the reference numerals 42 and 43.

The switch 42 is connected to the −300 VDC source and has an output connected to all of the switches 341, 342 . . . through a power bus line 44 in such a manner that the switches 341, 342 . . . are connected to the −300 VDC supply through the switch 42. Similarly, the switches 361, 362 . . . are connected to the −300 VDC supply through a power bus line 46 and the switch 43.

When a negative recording signal A is applied to the switch 42, the switch 42 is turned on and gates the −300 VDC voltage through the power bus line 44 to the switch group 34. The switch 42 is turned off by a positive signal A, causing the −300 VDC to be removed from the switch group 34. A negative recording signal B applied to the switch 43 causes the switch 43 to apply −300 VDC to the switch group 36 in the same manner.

In accordance with the present invention, the negative signals A and B are applied to the switches 43 in simultaneity with the data signals $a_1$, $a_2$ . . . and $b_1$, $b_2$ . . . respectively. In other words, when the data signals $a_1$, $a_2$ . . . are applied to the switch group 34, the negative signal A is applied to the switch 42. Thus, −300 VDC is made available to the switch group 34 and bus lines 22 for electrostatic recording. However, at this time the negative signal B is not applied to the switch 43 and the switch 43 is turned off thereby removing the −300 VDC from the switch group 36. This eliminates wasteful power consumption in the switch group 36 when the same is not being used for recording, since there is no current flow through the resistors 361b, 361c . . . . However, in accordance with an important feature of the present invention, the logically low signals applied to the switches 361, 362 . . . during nonapplication of the signal B turns on the transistors 361a, 362a . . . thereby grounding the bus lines 23 through the collector circuits of the transistors 361a, 362a . . . . This positively prevents erroneous recording without the wasteful power consumption inherent in the prior art. Any negative potential induced in a recording electrode connected to one of the bus lines 23 from an energized rear electrode bus line 22 is dissipated to ground through the low resistance path of the respective bus line 23 and transistor 361a, 362a . . . .

The effect is opposite during application of the negative signal B.

The power switch 42 comprises an NPN switching transistor 42a, the emitter of which is connected to the −300 VDC source. The collector of the transistor 42a is connected to ground through a resistor 42b and also to the line 44 through a diode 42c. The cathode of the diode 42c is connected to the collector of the transistor 42a. The collector of the transistor 42a is also connected to the base of an NPN transistor 42d, the emitter of which is connected to the anode of the diode 42c. The collector of the transistor 42d is grounded.

The base of the transistor 42a is connected to the −300 VDC source through a resistor 42e and also to the collector of a PNP transistor 42f through a resistor 42g. The recording signal A is applied to the base of the transistor 42f through a resistor 42h. The base of the transistor 42f is grounded through a resistor 42i. The emitter of the transistor 42f is grounded directly.

The transistor 42f serves to invert the negative signal A and turn on the transistor 42a which gates the −300 VDC voltage to the line 44 through the collector circuit thereof and the diode 42c.

Figure 3:
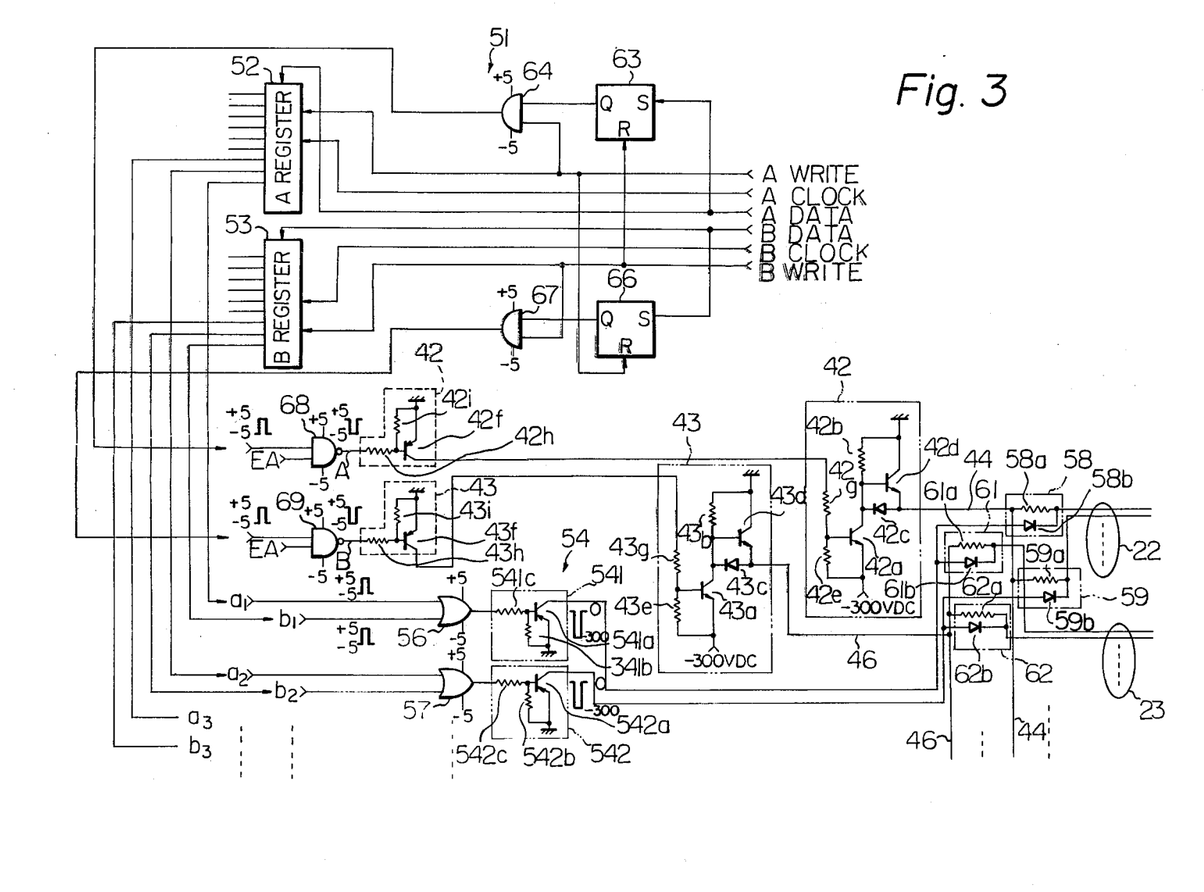
FIG. 3 shows a modification of the present apparatus.

FIG. 3 illustrates a yet further improved embodiment of the present invention which is designated as 51. The apparatus 51 comprises an A register 52 which serves as an input and storage means for the data signals $a_1$, $a_2$ . . . which are applied to the bus lines 22. Similarly, a B register 53 is provided for the signals $b_1$, $b_2$ . . . which are applied to the bus lines 23.

The registers 52 and 53 are serial-in, parallel-out. The signals $a_1$, $a_2$ . . . are collectively designated as A data and are fed serially into the register 52 in synchronism with A clock pulses. The register 52 produces all logically low outputs while receiving serial data. In response to an A write signal, the signals $a_1$, $a_2$ . . . appear at respective parallel outputs of the register 52. The register 53 functions in an essentially similar manner in response to B data, B clock and B write signals.

The apparatus 51 replaces the 48 data switches of the group 34 and the 48 data switches of the group 36 (total 96 data switches) with only 48 data switches 541, 542 . . . which constitute a group 54. This reduces the number of data switches to one-half the number in the prior art apparatus 21 or the present apparatus 41. Since the transistors in the data switches must withstand an emitter-collector potential of 300 VDC when turned off, they are relatively expensive. Thus, it is highly desirable to reduce the number of these transistors.

The switch 541, for example, comprises a PNP transistor 541a, the emitter of which is grounded directly and the base of which is grounded through a resistor 541b. The output of an OR gate 56 is connected to the base of the transistor 541a through a resistor 541c. Inputs of the OR gate 56 are connected to the $a_1$ output of the register 52 and the $b_1$ output of the register 53 respectively. In an essentially similar manner, the output of an OR gate 57 is connected to the base of the transistor 542a through a resistor 542c. Inputs of the OR gate 57 are connected to the $a_2$ output of the register 52 and to the $b_2$ output of the register 53. Although not shown, the apparatus 51 comprises 46 more OR gates provided to the other respective switches of the group 54 for the signals $a_3$ . . . $a_{48}$ and $b_3$ . . . $b_{48}$.

The power bus line 44 is connected to all of the bus lines 22 through respective AND gates, only two of which are shown and designated as 58 and 59. Similarly, the power bus line 46 is connected to all of the bus lines 23 through respective AND gates, only two of which are shown and designated as 61 and 62. The collector of the transistor 541a of the switch 541 is connected to inputs of both of the AND gates 58 and 61. The collector of the transistor 542a of the switch 542 is connected to inputs of both of the AND gates 59 and 62. Essentially similar connections are made for the other data switches and bus lines.

The AND gates 58, 59, 61 and 62 are identical and comprise like elements which are designated by the characters "a", "b" . . . suffixed to the respective reference numerals. The AND gate 58 comprises a resistor 58a connected between the power bus line 44 and the respective data bus line 22. The AND gate 58 further comprises a diode 58b connected between the collector of the transistor 541a and the respective data bus line 22, with the anode of the diode 58b connected to the transistor 541a.

The set and reset inputs of a flip-flop 63 are connected to receive the A data and B write signals respectively. The Q output of the flip-flop 63 is connected to an input of an AND gate 64. The A write signal is applied to another input of the AND gate 64.

The set and reset inputs of a flip-flop 66 are connected to receive the B data and A write signals respectively. The Q output of the flip-flop 66 is connected to an input of an AND gate 67. The B write signal is applied to another input of the AND gate 67.

The output of the AND gate 64 is connected to an input of a NAND gate 68, the other input of which is connected to receive a signal EA. The output of the NAND gate 68 is connected to the base of the transistor 42f of the switch 42 through the input resistor 42h. The output of the AND gate 67 is connected to an input of a NAND gate 69, the output of which is connected to the base of the transistor 43f of the switch 43 through the input resistor 43h. The other input of the NAND gate 69 is connected to receive a signal EB. It will be noted that the various gates of the apparatus 51 operate such that the logically high level is positive ($+5$ V) and the logically low level is negative ($-5$ V).

Figure 4:
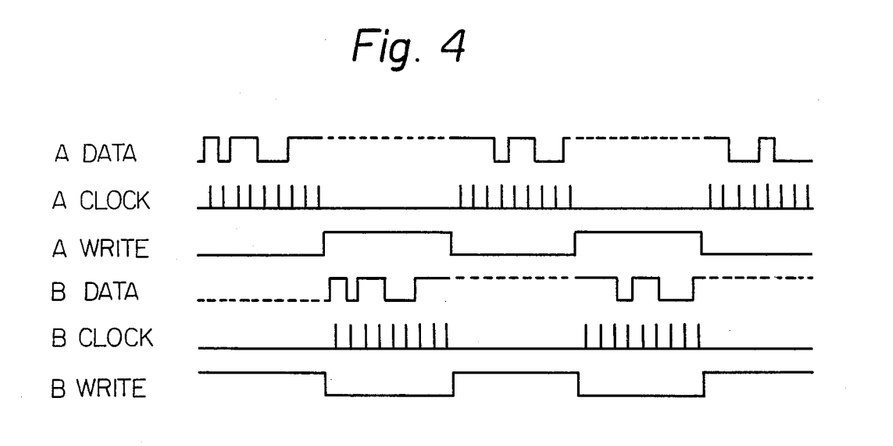
FIG. 4 is a timing diagram of the apparatus of FIG. 3.

The operation of the apparatus 51 will now be described with reference also being made to FIG. 4.

Firstly, the A data is fed into the register 52 serially in synchronism with the A clock pulses. The A write signal is logically low, so all low outputs appear at the output of the register 52. Simultaneously with feeding the A data into the register 52, the B data is being output from the register 53 for electrostatic recording in a manner which will become clear from further description. It will be assumed that at least one of the data $a_1$, $a_2$... is logically high, and that this logically high data will set the flip-flop 63, the high Q output of which will enable the AND gate 64.

During input of the A data, the A write signal is low and the AND gate 64 produces a low output even through the flip-flop 63 is set. The low output of the AND gate 64 inhibits the NAND gate 68 which produces a high output. The high output of the NAND gate 68 turns off the transistor 42f and thereby the switch 42, preventing the $-300$ VDC from being applied to the power bus line 44.

After the A data has been completely read into the register 52, the A write signal goes high. It will be noted that the B write signal was high during reading in of the A data and goes low at the same time the A write signal goes high. The low B write signal turns off the switch 43 and prevents the $-300$ VDC from being applied to the power bus line 46.

The high A write signal causes the signals $a_1$, $a_2$... to appear at the outputs of the register 52. These signals are applied to the data switches 54₁, 54₂... through the OR gates 56, 57 ... respectively. The high A write signal also causes the AND gate 64 to produce a high output which is applied to the NAND gate 68. The signal EA corresponds to an energization signal for the rear electrodes and causes the NAND gate 68 to produce a low output when applied. The low output of the NAND gate 68 turns on the transistor 42f and thereby the switch 42, causing $-300$ VDC to be applied to the power bus line 44. Thus, $-300$ VDC is applied to the inputs of the AND gates 58, 59 ....

Where the signal $a_1$ is logically high, the transistor 54₁ is turned off. There is no current flow through the diode 58b, and the $-300$ VDC is applied to the respective bus line 22 through the resistor 58a, causing electrostatic recording at the recording electrode adjacent to the energized rear electrode. Where the signal $a_1$ is logically low, the transistor 54₁ is turned on, grounding the anode of the diode 58b through the collector circuit thereof. Current flow through the resistor 58a and diode 58b places the respective bus line 22 at ground potential, preventing electrostatic recording at all recording electrodes connected to the respective bus line 22.

The operation is analogous for the other data signals and bus lines 22. Furthermore, the operation is analogously opposite for the data signals $b_1$, $b_2$ ... and B write signal.

The rising edge of the B write signal resets the flip-flop 63. The flip-flops 63 and 66 serve to further prevent wasteful power consumption in the following manner.

Where all of the signals $a_1$, $a_2$... are logically low, or essentially void of useful information, power is needlessly consumed if the switch 42 is turned on and power dissipated in the resistors 58a, 59a ... of the AND gates 58, 59 .... The flip-flop 63 is set by the first logically high A data, and enables the AND gate 64 which produces a high output when the A write signal goes high. However, if there is no logically high A data signal, the flip-flop 63 will not be set and the AND gate 64 will not produce a high output even when the A write signal goes high. Thus, the switch 42 will not be turned on and $-300$ VDC will not be applied to the bus line 44 for the bus lines 22. In this manner, there is no wasted power consumption for the duration of the A write signal.

In the apparatus 51 it is desirable to operate the switches 42 and 43 as quickly as possible. However, the storage time of the transistors 42a and 43a tends to vary depending on the collector current. Where all of the data signals except one are logically low, the current flow through the transistors 42a and 43a is maximum for the reasons described hereinabove. Where each resistor 58a, 59a, 61a, 62a ... passes 3 mA of current, the maximum collector current flow through either of the transistors 42a and 43a is 3 mA $\times$ (48–1)switches = 141 mA. On the other hand, if all of the data signals are logically low, the current flow is zero. The current may have any of (48–1) different values between zero and 141 mA. The maximum collector current flow is $h_{FE}$ times the base current flow.

This variation in collector current has a major effect on the storage time of the transistors 42a and 43a. In order to obtain maximum speed of operation of the apparatus 51, the storage time of the switches 42 and 43 must be minimized.

Figure 5:
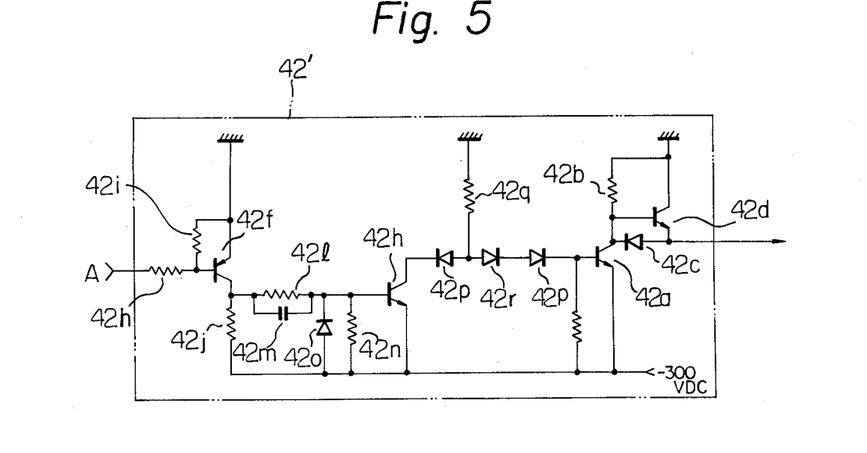
FIG. 5 shows an improved construction of a power switch circuit of the apparatus of FIGS. 2 or 3.

FIG. 5 shows an improved version of the switch 42 which is here designated as 42'. The switch 42' is designated to function as a saturation type circuit. In addition to the various components of the switch 42, the switch 42' comprises a resistor 42j connected between the collector of the transistor 42f and $-300$ VDC. The collector of the transistor 42f is further connected to the base of an NPN transistor 42k through the parallel combination of a resistor 42l and a capacitor 42m. The emitter of the transistor 42k is connected to $-300$ VDC. The base of the transistor 42k is further connected to $-300$ VDC through the parallel combination of a resistor 42n and diode 42o, with the anode of the diode 42o being connected to the base of the transistor 42k.

The collector of the transistor 42k is connected to the cathode of a diode 42p, the anode of which is grounded through a resistor 42q. The anode of the diode 42p is further connected to $-300$ VDC through diodes 42r and 42s and the resistor 42e. The anodes of the diodes 42p and 42r are connected together, with the cathode of the diode 42r being connected to the anode of the diode 42s.

Although the switch 42' is an improvement over the switch 42, the storage time of the transistor 42a still depends on collector current. Even if a Baker clamping circuit is added, the variation in storage time is still not negligible. Also, heat generation begins to become a problem.

Figure 6:
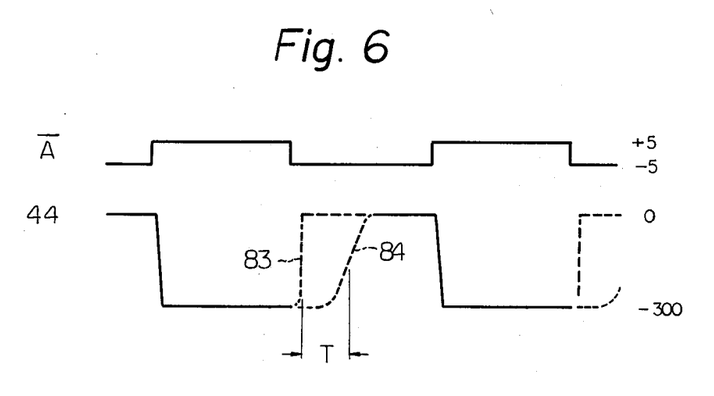
FIG. 6 is a diagram illustrating power switch storage time.

FIG. 6 shows the effects of variation of storage time on the rising edge of the −300 VDC signal on the line 44. A curve 83 illustrates minimum storage time which occurs with maximum collector current. A curve 84 shows maximum storage time which occurs with minimum current. A time lag T is inherent in maximum storage time operation.

Figure 7:
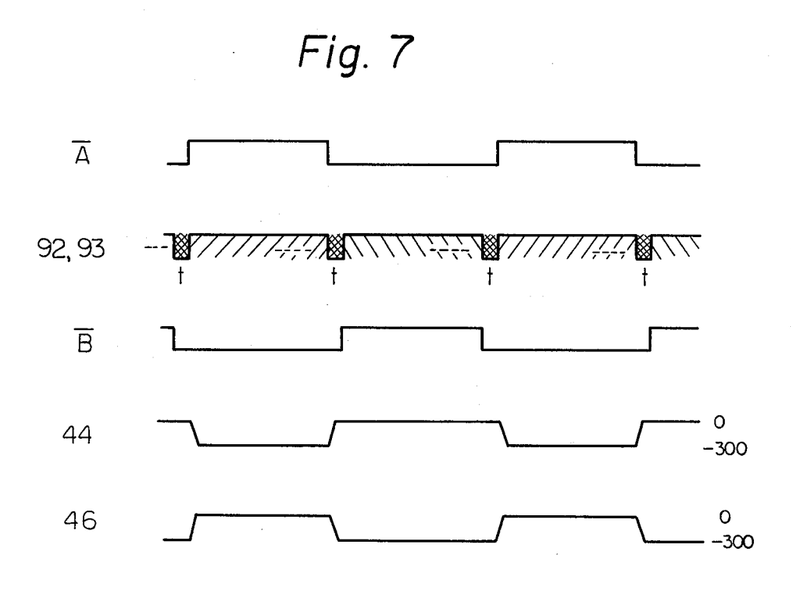
FIG. 7 is a diagram illustrating reduction of storage time in accordance with the present invention.
Figure 8:
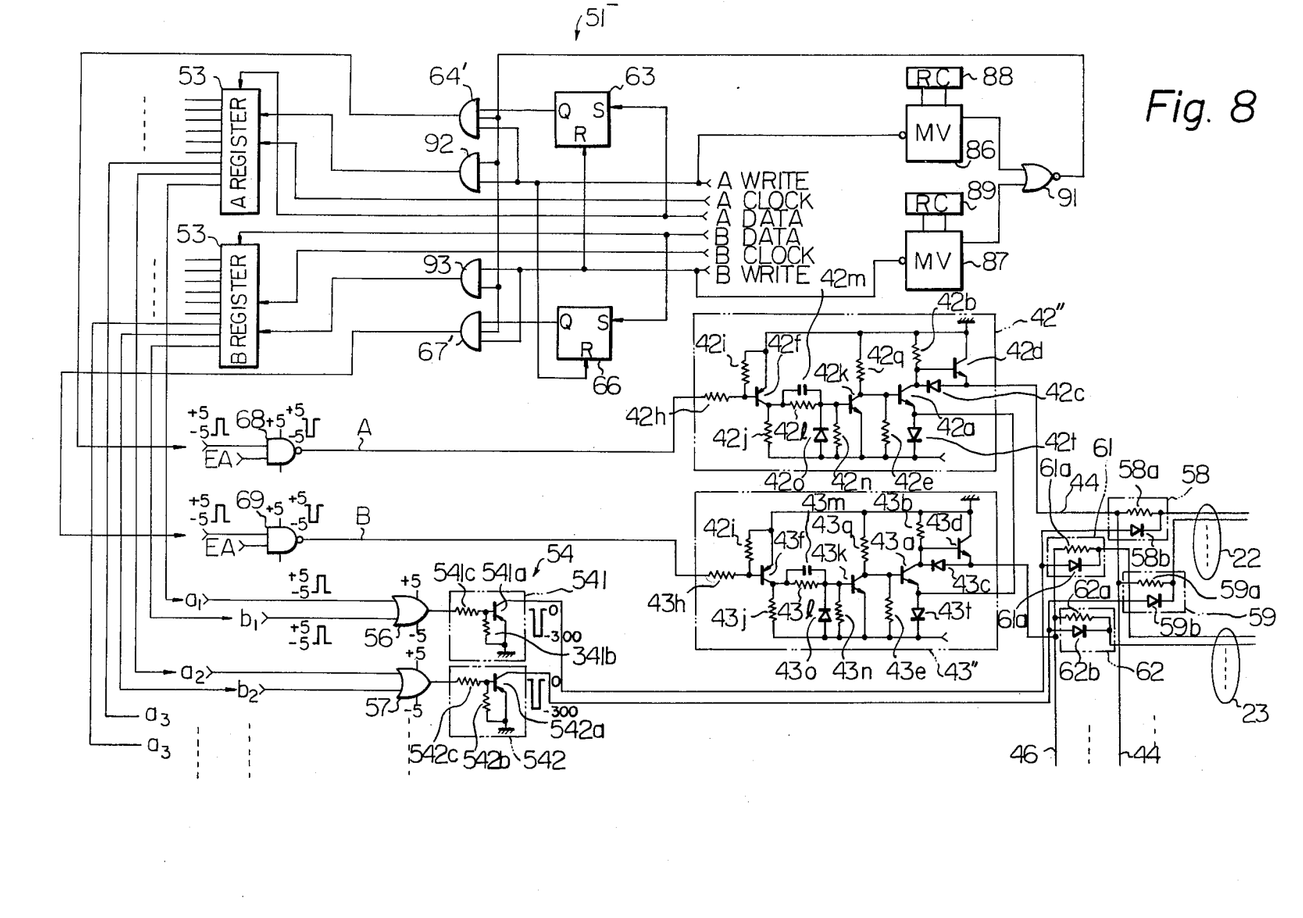
FIG. 8 shows an apparatus comprising means for reducing storage time.

Maximum operating speed can be assured if the storage time of the switches 42 and 43 is minimized. This can be accomplished by causing the registers 52 and 53 to produce all logically low outputs for a time t after turning off either of the switches 42 and 43. A modified apparatus 51' for accomplishing this operation is illustrated in FIG. 8. A timing diagram for the apparatus 51' is shown in FIG. 7.

The apparatus 51' comprises monostable multivibrators 86 and 87 which have inverting inputs connected to receive the A and B write signals respectively. The multivibrators 86 and 87 are controlled by RC circuits 88 and 89 to produce positive outputs for the time interval t when triggered. The outputs of the multivibrators 86 and 87 are connected to inputs of a NOR gate 91, the output of which is connected to inputs of modified AND gates 64' and 67'. The output of the NOR gate 91 is further connected to inputs of AND gates 92 and 93. The A and B write signals are connected to other inputs of the AND gates 92 and 93 respectively. The outputs of the AND gates 92 and 93 are connected to the A and B write inputs of the registers 52 and 53 respectively.

In operation, the multivibrators 86 and 87 are triggered by the trailing edges of the A and B write signals respectively. The NOR gate 91 produces a logically low output for the time t regardless of which of the multivibrators 86 and 87 was triggered. This low output inhibits all of the AND gates 64', 67', 92 and 93.

The AND gates 64' and 67' produce low outputs which turn off modified switches 42" and 43". The low outputs of the AND gates 92 and 93 inhibit the parallel outputs of the registers 52 and 53, so that all of the signals $a_1, a_2 \ldots$ and $b_1, b_2 \ldots$ are low. This turns on all of the switches 541, 542 . . . , producing a minimum resistance path to ground for the collector circuits of the switches 42" and 43". This has the effect of minimizing the storage time or the turn-off time of the switches 42" and 43" as illustrated in FIG. 6 by the curve 83.

The switches 42" and 43" are identical, and the following description applies to both. Taking for example the switch 42", the storage time may be reduced by decreasing the value of the resistor 42e. However, this has the effect of shunting the current applied to the base of the transistor 42a from the preceding stage, and deteriorates the utilization factor of the circuit. For this reason, it is preferable to give the resistor 42e a large value and directly connect the collector of the transistor 42k to the base of the transistor 42a or make the connection through a low value resistor. Since the resistor 42e has a high value, when the transistor 42k is turned off, a large portion of the current flow through the resistor 42e flows through the base of the transistor 42a, greatly improving the utilization factor. When the transistor 42a is turned on, the charge stored in the base thereof discharges through a very low resistance path since the transistor 42k is turned on. This increases the speed of the positive transition of the collector voltage of the transistor 42a. Also, by connecting the emitter of the transistor 42a to −300 VDC through a diode 42t, the anode of the diode 42t being connected to the base of the transistor 42a, it is possible to establish a reverse bias due to the voltage drop across the diode 42t and further decrease the rise time of the collector voltage of the transistor 42a.

Figure 9:
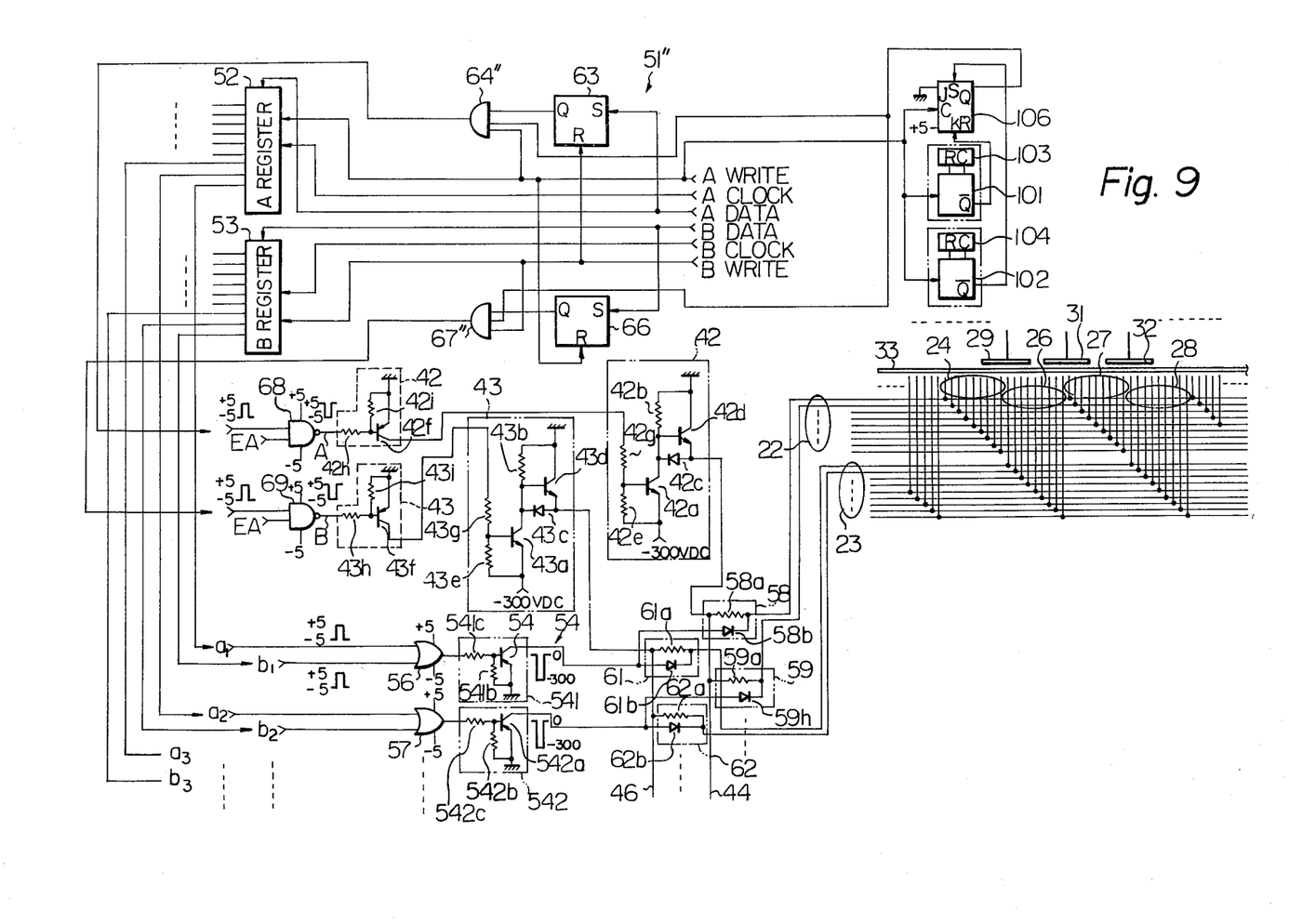
FIG. 9 shows an apparatus comprising means for providing optimum recording density at various recording speeds.

FIG. 9 illustrates another apparatus 52" of the present invention which is adapted to operate effectively at various speeds. The density of the image recorded on the sheet 33 by the apparatus 51" depends on the recording speed and the length of time the recording signals A and B are applied. It is often desired to operate a facsimile system at various predetermined speeds which offer a tradeoff between transmission speed and resolution. The apparatus 51" incorporated in such a system is capable of such multi-speed operation.

Generally, the recorded image density increases with the length of time the signals A and B are applied and decreases with the recording speed. This is because the signals A and B, if derived directly from the A and B write signals as in the apparatus 51 and 51', decrease in duration as the recording speed increases. At low speeds, the signals A and B are so long that the image density is excessive and ghost images are produced.

To overcome this problem the apparatus 51" comprises monostable multivibrators 101 and 102 having periods determined by RC circuits 103 and 104 respectively. Inputs of the multivibrators 101 and 102 are connected to receive the A write signal. The apparatus 51" further comprises a JK flip-flop 106 which is connected to have two reset inputs and one set input. The A write signal is fed to the clock input thereof. The J input is grounded and the K input is connected to +5 V. The flip-flop 106 and multivibrators 101 and 102 are connected to be triggered by both the leading and trailing edges of the A write signal. The $\overline{Q}$ outputs of the multivibrators 101 and 102 are connected to the reset and set inputs of the flip-flop 106 respectively. The Q output of the flip-flop 106 is connected to inputs of modified AND gates 64" and 67".

Figure 10:
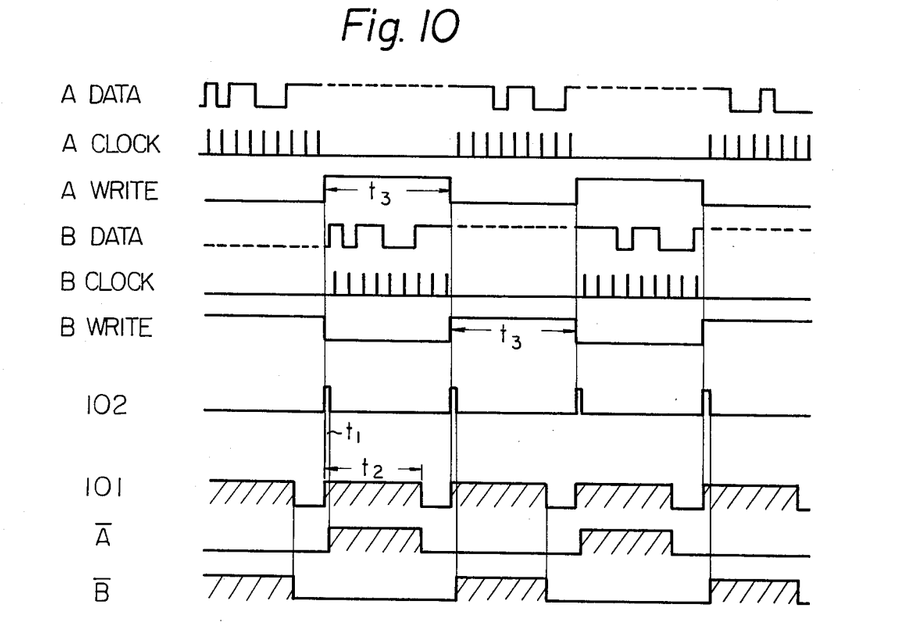
FIG. 10 is a timing diagram illustrating the operation of the apparatus of FIG. 9 at low speed.

The operation of the apparatus 51" at low speed is illustrated in FIG. 10, with the periods of the multivibrators 101 and 102 being designated as t2 and t1 respectively. The flip-flop 106 is reset by a transition of the A write signal since the K input is +5 and the J input is grounded. Also, the multivibrators 101 and 102 are triggered. The multivibrator 102 produces a short pulse t2, at the termination of which the $\overline{Q}$ output of the multivibrator 102 goes high. This sets the flip-flop 106, the high output of which enables the AND gates 64" and 67". Thus, the A or B write signal (depending on whether the transition of the A write signal was negative or positive) is applied to the respective switch 42 and 43 to generate the signal A or B for recording.

The time t2 is selected to be optimum for recording. At the end of this time, the $\overline{Q}$ output of the multivibrator 101 goes high and resets the flip-flop 106. The Q output of the flip-flop 106 goes low, inhibiting the AND gates 64" and 67" and thereby the signal A or B. Thus, although a duration of the A write signal, designated as t3, is greater than the duration t2, the recording electrodes are only energized for the time t2.

Figure 11:
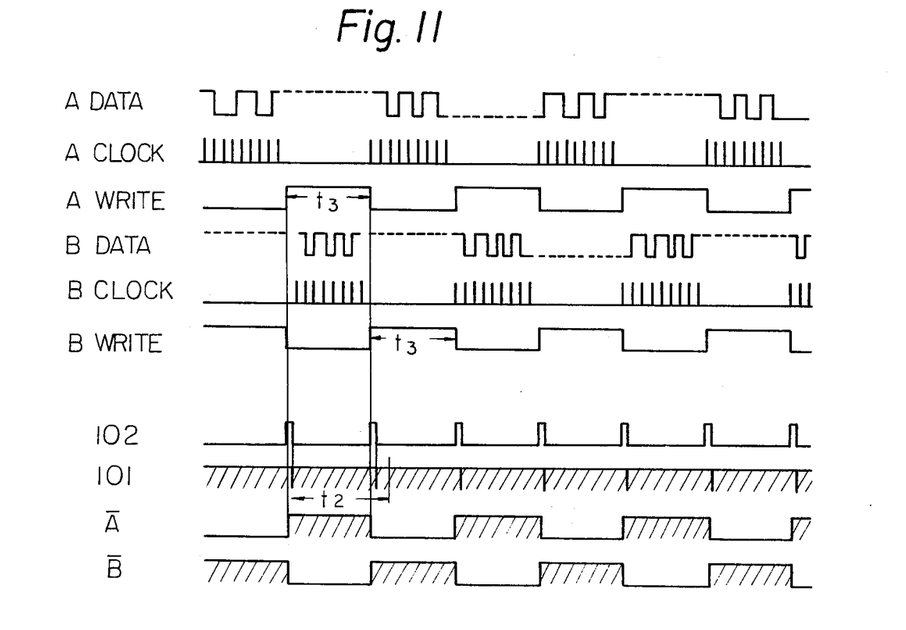
FIG. 11 is similar to FIG. 10 but illustrates operation at high speed.

FIG. 11 illustrates the operation of the apparatus 51" at high speed whereas the time t3 is less than the time t2. In this case, the multivibrator 101 will be continuously triggered before it is able to time out, and the signal A or B will have the duration t3. Thus, at high recording speeds where t3 is less than t2, the recording is performed for the length of time t3. However, at low recording speeds, the recording duration is limited to the optimum value t2, positively preventing excessive recording density and the formation of ghost images.

In summary, it will be seen that the present invention overcomes the drawbacks of the prior art and provides an electrostatic recording apparatus which operates at increased speed, dissipates less current and provides higher quality recording than possible heretofore.

Various modifications will become possible for those skilled in the art after receiving the teachings of the present disclosure without departing from the scope thereof.

What is claimed is:

1. An electrostatic recording apparatus comprising:
a power source;
a plurality of first bus lines;
a plurality of second bus lines;
a plurality of first recording electrodes connected to the first bus lines respectively;
a plurality of second recording electrodes connected to the second bus lines respectively;
first input means for receiving and storing first data signals;
second input means for receiving and storing second data signals;
a plurality of first data switch means connected between the power source and the first bus lines and being further connected to the first input means to receive the first data signals respectively as gate inputs;
a plurality of second data switch means connected between the power source and the second bus lines and being further connected to receive the second data signals respectively as gate inputs;
first power switch means connected between the power source and all of the first data switch means;
second power switch means connected between the power source and all of the second data switch means; and
control means for alternatingly applying first and second recording signals to the first and second power switch means for turning on the first and second power switch means.

2. An apparatus as in claim 1, in which the first and second data switch means are constructed to connect the first and second bus lines to the first and second power switch means in response to logically high respective first and second data signals and to ground the first and second bus lines in response to logically low respective first and second data signals.

3. An apparatus as in claim 2, in which the first and second power switch means comprise first and second transistors respectively, the apparatus further comprising first and second means for reducing storage times of the first and second transistors respectively.

4. An apparatus as in claim 3, in which said first and second means are constructed to control the first and second data switch means to ground all of the first and second bus lines for a predetermined length of time after turning off of the first and second power switch means respectively.

5. An apparatus as in claim 4, in which said first and second means are constructed to control the first and second input means to produce all logically low outputs for the predetermined length of time.

6. An apparatus as in claim 1, in which the control means comprises means for sensing when all of the first data signals are logically low and inhibiting turning on the first power switch means in response thereto;
the control means further comprising means for sensing when all of the second data signals are logically low and inhibiting turning on the second power switch means in response thereto.

7. An apparatus as in claim 1, in which the first and second data switch means are integral and comprise a plurality of data switches, the first and second bus lines and the data switches being provided in equal numbers, the apparatus further comprising a plurality of OR gate means having inputs connected to respective outputs of the first and second input means and outputs connected to inputs of respective data switches; the first and second input means producing logically low outputs in the absence of the first and second recording signals respectively; the apparatus further comprising a plurality of first AND gate means having inputs connected to an output of the first power switch means and to outputs of respective data switches, and outputs connected to respective first bus lines; and a plurality of second AND gate means having inputs connected to an output of the second power switch means and to outputs of respective data switches, and outputs connected to respective second bus lines.

8. An apparatus as in claim 1, adapted to operate at a plurality of recording speeds, the apparatus further comprising timing means for limiting durations of the first and second recording signals to predetermined values at respective recording speeds.

9. An apparatus as in claim 8, in which the timing means is constructed to limit the durations of the first and second recording signals to a single predetermined value at all recording speeds.

* * * * *